Patented Apr. 1, 1952

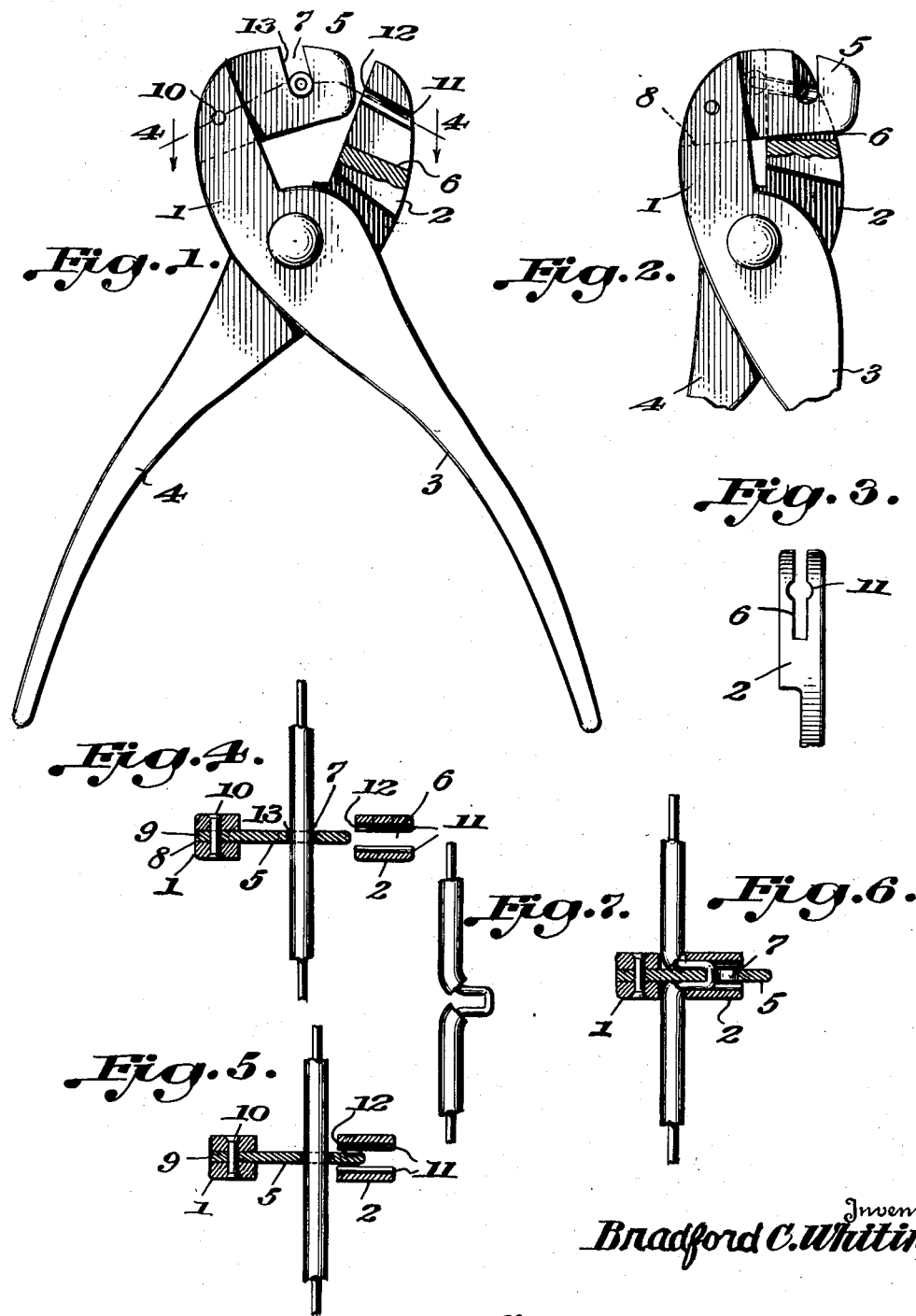

2,591,649

UNITED STATES PATENT OFFICE 2,591,649

WIRE FORMER AND STRIPPER

Bradford C. Whiting, Poughkeepsie, N. Y., assignor to International Business Machines Corporation, New York, N. Y., a corporation of New York Application January 13, 1948, Serial No. 2,071

6 Claims. (Cl. 7—5.4)

This invention relates to a device for stripping insulation from electric wires and at the same time forming said wires into a desired configuration, and more particularly to a means, hereinafter described, embodying cooperating elements which may be carried by the jaws of pliers or similar devices which are capable of bringing said cooperating elements together into operative relationship to thereby perform the intended functions in a single movement.

In wiring electrical apparatus, it will be appreciated that there are many instances where connections must be made between an insulated wire and various points on the assembly to complete the desired operative electrical circuits. Wherever a connection is to be made the wire must be stripped of its insulation at that point and additionally it is usually desirable to form the stripped wire into a loop or tit whereby the connection may be more readily made, all as will be fully understood by those skilled in this art.

It will accordingly be seen that to produce a loop or tit in an insulated wire, which loop or tit is stripped of its insulation, two operations are necessary. The insulation must be first stripped from the wire and the wire must thereafter be formed into the desired loop or configuration. Heretofore the stripping and forcing of the wire have involved two independent operations which it will be appreciated have been time consuming.

It is therefore a primary object of the invention to provide a novel form of device for stripping insulation from an insulated wire and at the same time forming the stripped wire.

Another object of the invention is to provide an improved wire former which in addition to forming the wire, strips the same of its insulation, all in a single operation of the device.

A further object of the invention is to provide cooperating jaw-like elements having their meeting surfaces of an improved and novel form whereby on being moved into contact with each other an insulated wire placed therebetween will be simultaneously stripped of its insulation and formed with a loop or tit thereon.

A still further object of the invention is to provide a combined wire stripper and former, the same being highly efficient in operation and relatively inexpensive to manufacture and produce.

To the accomplishment of the above and related objects, as will appear as the description proceeds, the invention may be embodied in the forms illustrated in the accompanying drawings, attention being called to the fact, however, that the drawings are illustrative only, and that changes may be made in the specific constructions illustrated and described, so long as the scope of the appended claims is not violated.

In the accompanying drawings which form a part of this application,

Figure 1 is a view in front elevation of the improved wire former and stripper device, with the head 2 partly broken away and shown in section to reveal the slot 6 and the transversely extending groove at 11;

Figure 2 is a fragmentary front elevation showing the head elements in closed position at the end of a forming and stripping operation, with the head 2 partly broken away and shown in section to disclose the position of the blade-like element 5 and the wire;

Figure 3 is a fragmentary view in side elevation of the slotted head member 2;

Figures 4, 5 and 6 are sectional views through the two heads taken on the line 4—4 of Figure 1, and showing progressively the operation of the novel elements as they approach each other in a wire stripping and forming operation;

Figure 7 is a plan view of the wire following a wire stripping and forming operation, showing the formed loop of bare wire.

Like characters of reference are used throughout the following specification and the accompanying drawings to designate corresponding parts.

The improved wire former and stripper comprises two jaw-like heads 1 and 2 which as shown in the drawings may be mounted on or carried by pivoted handle members 3 and 4 respectively much in the manner of conventional pliers. The head 1 carries a blade-like member 5 which extends substantially at right angles to said head 1 and which is adapted to enter a cooperating slot 6 formed in the head 2 when the heads 1 and 2 are moved toward each other by manually bringing the handle members 3 and 4 together.

The blade-like member 5 is provided with a notch 7 extending inwardly from the upper and outer side thereof, said notch being spaced from the body of the head 1 as well as from the end of the blade-like member and formed of sufficient width to receive the insulated wire. The head 1 is preferably slotted as at 8 to receive the end 9 of the blade element 5 which is fixed thereto by any suitable means such as a rivet or screw 10. It will be appreciated however that the blade-like element 5 may, if desired, be formed integrally with the head member 1.

The slot 6 in head 2 is formed of a width just slightly greater than the thickness of the blade 5 thereby permitting the blade to be readily insertable and movable therein when the two heads are moved together. At a point 11, spaced from the end of head 2 and corresponding to the position of the wire as it is carried in the notch 7 in head 1, both sides of the slot 6 are transversely grooved sufficiently to accommodate the blade 5 with the stripped wire bent to lie on each side of the blade in said grooves as will be clearly understandable by reference to Figs. 2 and 6 of the accompanying drawings.

The manner in which the device functions in a stripping and forming operation is clearly illustrated in Figs. 4, 5 and 6. The operator lays the insulated wire in the groove or notch 7 and on manually gripping the handles 3 and 4, the jaws are moved into cooperative relationship. The blade 5 will move freely into the slot 6 of the head 2 until the insulated wire being carried in the notch 7 reaches the face 12 of the head 2. At this point, the stripping and forming begins. On the continued movement of blade 5 into the slot 6 the edge of face 12 of the head 2 in cooperation with the back 13 of the notch 7 cuts and tears the insulation from the wire. It will be appreciated in this connection that the transversely extending grooves 11 are of sufficient depth to receive the bare or stripped wire on either side of the blade 5 as the latter enters the slot 6 and the wire is formed around the back face 13 of slot 7, but are of insufficient depth to accommodate the insulation. Consequently, further movement results in stripping the insulation and forming the stripped wire in a loop or tit around the back 13 of the notch 7, and the sides of the blade, as that portion of the blade with the stripped wire moves past the face 12 and into the slot 6. The length of the stripped loop so formed will of course depend on the distance of travel of the notch 7 in the head 2, which distance will be under the manual control of the operator.

The cooperating jaw-like elements heretofore described need not necessarily be mounted on a pliers-like body as shown in the drawings, but could instead be mounted on any two elements that are adapted to be moved into and out of contact with each other. The function and operation of the novel cooperating surfaces would of course be the same. Further, it will be understood that it will be within the spirit of this invention to make the bladed head and slotted head detachable so that one set of heads may be removed and replaced by another set of related heads to thereby strip and form a wire of a different size and gage.

What I claim and desire to secure by United States Letters Patent is:

1. A tool for forming a loop in an insulated wire comprising cooperating male and female members adapted to be moved into and out of engagement with each other and to form a loop in a wire placed therebetween, wire supporting means on said male member, and means on said female member cooperating therewith to strip insulation from said wire, including means for accommodating the stripped wire during the forming of the loop therein as the wire supporting means on the male member enters the female member.

2. A combined wire forming and insulation stripping device comprising cooperating head members adapted to be moved toward and away from each other, wire supporting means carried by one of said head members and extending therefrom toward the other of said head members, the other of said head members being provided with a slot to receive said wire supporting means therein when said head members are moved toward each other, and means associated with the slotted head member and cooperating with said wire supporting means to strip the insulation from a wire and form the stripped portion thereof into a loop, including means for accommodating the formed stripped wire, as the said head members approach each other and the wire supporting means enters the slotted head member.

3. A combined wire forming and insulation stripping device comprising cooperating head members adapted to be moved toward and away from each other, a blade-like member carried by one of said head members and extending therefrom toward the other of said head members and provided with a wire receiving notch therein, the other of said head members being provided with a slot to receive said blade-like member therein when said head members are moved toward each other, and means associated with said slotted head member and cooperating with said notched blade-like member to strip the insulation from a wire and form the stripped portion thereof into a loop, said last mentioned means including means for accommodating the stripped wire as it is formed against the sides of the blade-like member, all in a single movement of said head members toward each other.

4. A combined wire forming and insulation stripping device comprising cooperating head members adapted to be moved toward and away from each other, wire supporting means carried by one of said head members and extending therefrom toward the other of said head members, the other of said head members being provided with a slot to receive said wire supporting means therein when said head members are moved toward each other, the walls forming said slot being grooved to provide an area of greater width extending transversely thereof and in alignment with the wire supporting means to accommodate the stripped wire and cooperating with said wire supporting means, whereby the insulation from a wire is stripped and the stripped portion thereof formed into a loop, all in a single movement of said wire supporting means into the slotted head member.

5. A combined wire forming and insulating stripping device comprising cooperating head members adapted to be moved toward and away from each other, a blade-like member carried by one of said head members and extending therefrom toward the other of said head members and provided with a wire receiving notch therein, the other of said head members being provided with a slot to receive said blade-like member therein when said head members are moved toward each other, the side walls forming the slot in said slotted head member having grooves extending transversely of said head member, said grooves being of sufficient depth to receive the stripped wire therein but of insufficient depth to accommodate the wire and its insulation, whereby said head members cooperate with each other to strip the insulation from a wire placed in said notch and form the stripped portion thereof into a loop in a single movement of said head members toward each other as the notch of the blade-like member passes into the slotted head member.

6. The device described in claim 5 wherein the cooperating head members are detachable from their supporting means so that different sets of related members may be readily substituted for operation on wires of different gage.

BRADFORD C. WHITING.

REFERENCES CITED

The following references are of record in the file of this patent:

UNITED STATES PATENTS

| Number | Name | Date |
|---|---|---|
| 500,551 | Barnett | July 4, 1893 |
| 594,852 | Brunell | Dec. 7, 1897 |
| 762,691 | Corrigan | June 14, 1904 |
| 787,947 | Sanger | Apr. 25, 1905 |
| 1,891,482 | Reichhelm | Dec. 20, 1932 |
| 1,929,497 | Kilmer | Oct. 10, 1933 |